United States Patent [19]

Cruickshank

[11] Patent Number: 4,779,460
[45] Date of Patent: Oct. 25, 1988

[54] SENSOR AND SYSTEM FOR MEAURING THE LEVEL OF A LIQUID IN A CONTAINER

[75] Inventor: William T. Cruickshank, Auburn Hills, Mich.

[73] Assignee: BLTEC, Inc., Rochester, Mich.

[21] Appl. No.: 115,831

[22] Filed: Nov. 2, 1987

[51] Int. Cl.$^4$ ............................................ G01F 23/60
[52] U.S. Cl. ........................................ 73/313; 73/308; 338/33; 338/47
[58] Field of Search ................... 73/313, 314; 338/69, 338/33, 47, 31, 154; 340/626

[56] References Cited

U.S. PATENT DOCUMENTS

| | | | |
|---|---|---|---|
| 2,226,629 | 12/1940 | Mather | 338/31 |
| 2,806,421 | 9/1957 | Huck | 338/31 X |
| 3,911,387 | 10/1975 | Seabury, Jr. | 338/47 |
| 4,052,901 | 10/1977 | Bjork | 73/313 |
| 4,276,538 | 6/1981 | Eventoff | 338/69 |
| 4,301,337 | 11/1981 | Eventoff | 200/5 A |
| 4,314,228 | 2/1982 | Eventoff | 338/114 |
| 4,573,106 | 2/1986 | Kuratani | 338/154 |
| 4,637,254 | 1/1987 | Dyben et al. | 73/314 |

Primary Examiner—Daniel M. Yasich
Attorney, Agent, or Firm—Brooks & Kushman

[57] ABSTRACT

A sensor and system for measuring the level of a liquid includes a linear potentiometer having a resistance circuit element and a mechanism for changing the resistance of the circuit element including a conductor formed from a semiconducting composition having a resistance inversely proportional to the horizontal force it experiences. The sensor includes an elongated vertical support structure and a float mechanism which is mounted on the support structure to move vertically therealong at the level of the liquid in a fuel storage tank. The float mechanism includes a roller which rolls along the support structure and supplies the horizontal force to the semiconducting composition. The semiconductor composition cooperates with another conductor coupled to the resistance circuit element to produce an electrical signal which is the function of the vertical position of the roller on the support structure. The system includes the sensor and a circuit for processing the electrical signal to provide a corresponding liquid level signal indicating the level of the fuel in the fuel storage tank.

19 Claims, 5 Drawing Sheets

SENSOR AND SYSTEM FOR MEASURING THE LEVEL OF A LIQUID IN A CONTAINER

TECHNICAL FIELD

This invention relates to a sensor and a system for measuring linear position and, in particular, to a sensor and a system for measuring the level of a liquid in a container.

BACKGROUND ART

A large number of sensing approaches and transducer types have been developed for the determination of the level of liquids in open or closed vessels or containers. Not only is the knowledge of the level itself important, but other measurements can be inferred from the level. For example, if the container geometry and dimensions are additionally known, the volume of the liquid can be determined. If additionally, the density of the liquid is known, it mass can be calculated.

Liquid level is generally sensed by one of two methods: obtaining a discrete indication if a predetermined level has been reached (i.e. point sensing) or obtaining an analog representation of the level as it changes (i.e. continuous sensing). One commonly employed apparatus for continuously sensing the level of liquid, such as a fuel, in fuel storage tanks is the use of a float mechanism.

Another type of continuous level sensing is called dielectric variation sensing or capacitive liquid level sensing. Capacitive liquid level sensing is primarily used with relatively non-conductive liquids which play the role of a dielectric material between multiple electrodes which are used and are electrically connected as plates of a capacitor. The capacitance changes continuously as the vertical height of the liquid changes in the tank. However, it is often necessary to compensate for changes in the characteristics of the liquid during measurement.

The U.S. Patent to Lenker No. 3,555,904, discloses a fluid indicating system, including a thermocouple, which includes two elements, one of which is made from an electrical resistance material. A shorting mechanism is slidably interposed between the elements on one end of the thermocouple. The shorting mechanism is responsive to the quantity of fluid to position itself alone one element to thereby change the effective electrical resistance in series with an electrical measuring circuit.

The prior art discloses other various devices for measuring the level of a liquid in a container such as U.S. Pat. Nos. 3,644,691, 4,343,184, 4,454,761, 4,457,171, 4,552,090, 4,589,282, 4,601,165 and 4,630,478.

A force sensing resistor is an ink whose electrical resistance decreases with minimum applied force. Such ink is produced by Interlink Electronics of Santa Barbara, Calif. Such ink is also disclosed in U.S. Patents to Eventoff, Nos. 4,301,337, 4,314,228, 4,276,538 and 4,451,714.

DISCLOSURE OF THE INVENTION

An object of the present invention is to provide an improved sensor and system for measuring the level of the liquid in a container which is relatively inexpensive yet accurate and easy to calibrate and does not require operator input and training.

In carrying out the above object and other objects of the present invention, a sensor for measuring the level of a liquid in a container includes a vertically extending support structure adapted to be received and retained within a container, a pair of electrically spaced terminals and at least one circuit element electrically coupled between the two terminals. The circuit element has an electrical property which varies at different portions of the circuit element between the terminals. The circuit element is supported on the support structure. Means are also provided for changing the effective electrical property of the circuit element between the terminals. The means for changing is electrically coupled to the different portions of the circuit element and is supported on the support structure to extend vertically therealong. The means for changing, in turn, includes first and second support members having inner and outer surfaces and first and second conductors. The first and second support members are juxtaposed so that the inner faces face one another in normally spaced apart relationship with the first and second conductors being laterally spaced in actuating proximity between the inner surfaces. The first and second conductors are horizontally movable into electrical conducting relationship at various vertical positions therealong corresponding to different values of the electrical property in response to application of a horizontal force at one of the outer surfaces. A float mechanism is connected to the support structure to reciprocate vertically in response to the level of the liquid in the container. The float mechanism includes a buoyant part and an actuator means connected to the buoyant part and fixed in vertical relationship to the buoyant part to exert the horizontal force. The so conducting first and second conductors provide an electrical signal which is a function of the vertical position of the actuator means along the support structure.

The system includes the above-noted sensor and further includes an electric circuit coupled to the pair of terminals and the conductors for processing the signal to provide a corresponding liquid level signal indicating the level of the liquid in the container.

Preferably, one of the first and second conductors is formed from a semiconducting composition having a resistance inversely proportional to the horizontal force. Also, preferably, the circuit element is a resistance element disposed between the first and second support members.

The sensor and system constructed in accordance with the present invention is easily manufactured, is relatively inexpensive and provides a large amount of sensitivity.

Preferably, the system also includes a display means so that the information about the liquid in the container is displayed continuously to eliminate the necessity of additional hardware and also the necessity to train an operator.

A single dedicated microprocessor can be used to replace the separate electrical components of the system. Such a programmed computer could convert level readings in inches to gallons, compensate for variations in volume due to temperature changes, monitor for unexpected volume change or leaks, sound alarms or have information dumped to a printer or sent over telephone lines to remote locations.

The above objects and other objects of the present invention are readily apparent from the following detailed description of the best mode in carrying out the invention when taken in connection with the accompanying drawings.

BEST MODE FOR CARRYING OUT THE INVENTION

Figure 1:
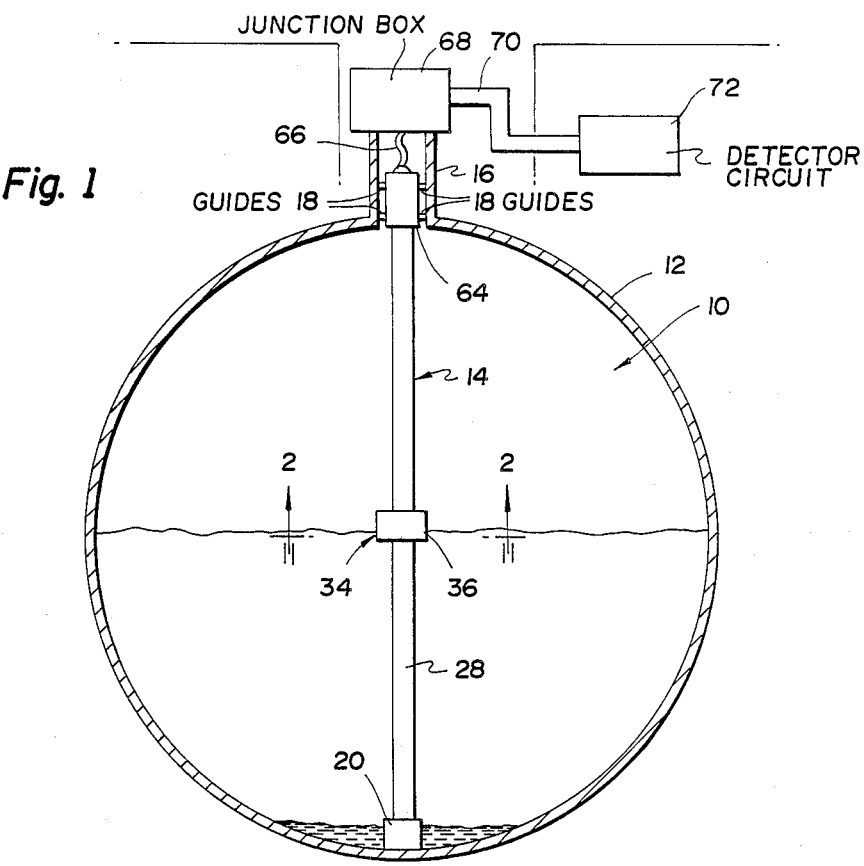
FIG. 1 is a schematic view illustrating the sensor and system of the present invention in operation within a fuel storage tank.

Referring now to the drawings, there is shown in FIG. 1 a sensor, generally indicated at 10, for measuring the level of liquid in a container such as a fuel storage tank 12. However, it is to be understood that the sensor 10 may be adapted to be mounted in a container to measure the level of other liquids such as vehicle liquids (i.e. fuel, transmission oil, engine oil and radiator fluid) by modifying the sensor, such as by changing the physical dimensions of the sensor. The sensor 10 can also be modified to measure linear distance along a base member such as in a machine tool application as can be readily appreciated by one of ordinary skill in this art.

FIG. 1 illustrates a typical installation of the sensor 10 in a cylindrical, underground fuel storage tank 12. The sensor 10 includes a vertically extending support structure, generally indicated at 14. The diameter of such fuel storage tanks 12 typically range from four to 12 feet. The bottom portion of the support structure 14 rides on the bottom of the tank 12 and the top portion of the support structure floats within a riser pipe 16 of the tank 16. Foam guides 18 allow the top portion of the support structure 14 to float freely within the riser pipe 16.

Preferably, a conventional water detector 20 is mounted on the bottom portion of the support structure 14 for detecting the level of a second liquid, such as water. The detector 20 provides an electrical signal related to the level of the water in the container 12.

By allowing the bottom portion of the support structure 14 to ride on the bottom of the fuel storage tank 12 and allowing the upper portion of the support structure to float freely within the riser pipe 16, accurate readings of the fuel level are ensured. This is because the bottom portion of the fuel storage tank 12 can move with the seasons. If the sensor 10 is fixed to the riser pipe 16 and the tank 12 moves, the readings from the sensor 10 will be inaccurate.

Calibration of the sensor 10 can be done at the factory, thereby eliminating the need for factory representatives to be on hand at installation. Other prior art units fixed to the riser pipe 16 require calibration in the field after installation because of variations in tank depth requiring longer or shorter riser pipes.

Figure 2:
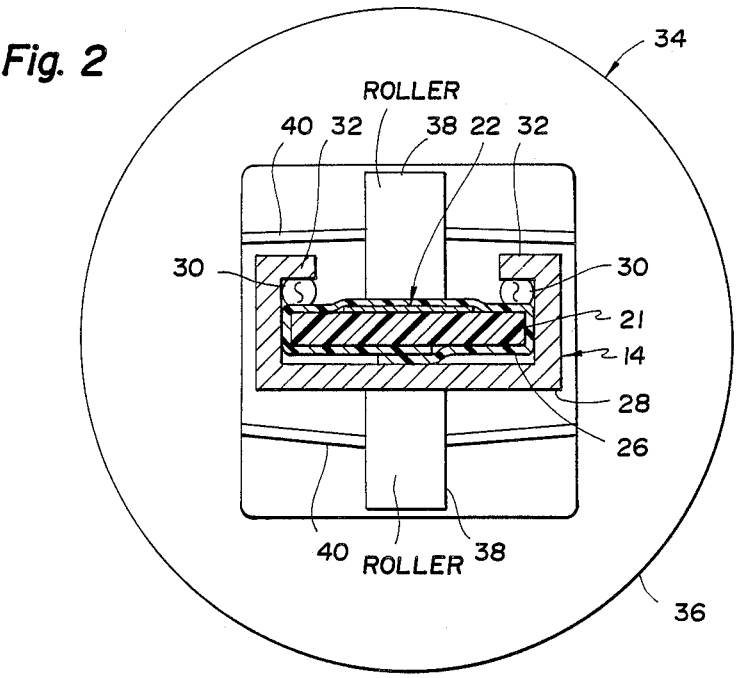
FIG. 2 is a sectional view of the sensor of FIG. 1 taken along lines 2—2 of FIG. 1.

Referring now to FIG. 2 there is illustrated the support structure 14 and the part of the sensor 10 which moves vertically on the support structure 14. The support structure 14 includes a rigid, non-conductive (i.e. plastic) central member 21 and a potentiometer device, generally indicated at 22, as will be described in greater detail with reference to the remaining drawing figures.

The potentiometer device 22 is wrapped on the support structure 14 by a continuous sheet of Teflon brand gasketing material 26 along the entire operative height of the sensor 10 (i.e. four to ten feet).

The support structure 14 also includes a C-shaped plastic extrusion 28 which receives and retains the potentiometer device 22 on the central member 21 with the gasketing material 26 thereover. A beading material 30 is compressed under the legs 32 of the extrusion 28 and the overlapping gasketing material 26 to seal the sensor 10.

A float mechanism, generally indicated at 34, includes a hollowed-out float portion 36 positioned over the support structure 14 to allow the float mechanism 34 to reciprocate vertically along the support structure 14 in response to the varying levels of liquid in the container 12.

The float mechanism 34 also includes a pair of spaced rollers 38 which are rotatably mounted to the float portion 36 by their respective roller shafts 40. The roller shafts 40 are made of a flexible material and are spaced in a manner to create spring-like horizontal force against the rollers 38 and thus against the gasketing material 26 and the outer faces of the potentiometer device 22.

Figure 3:
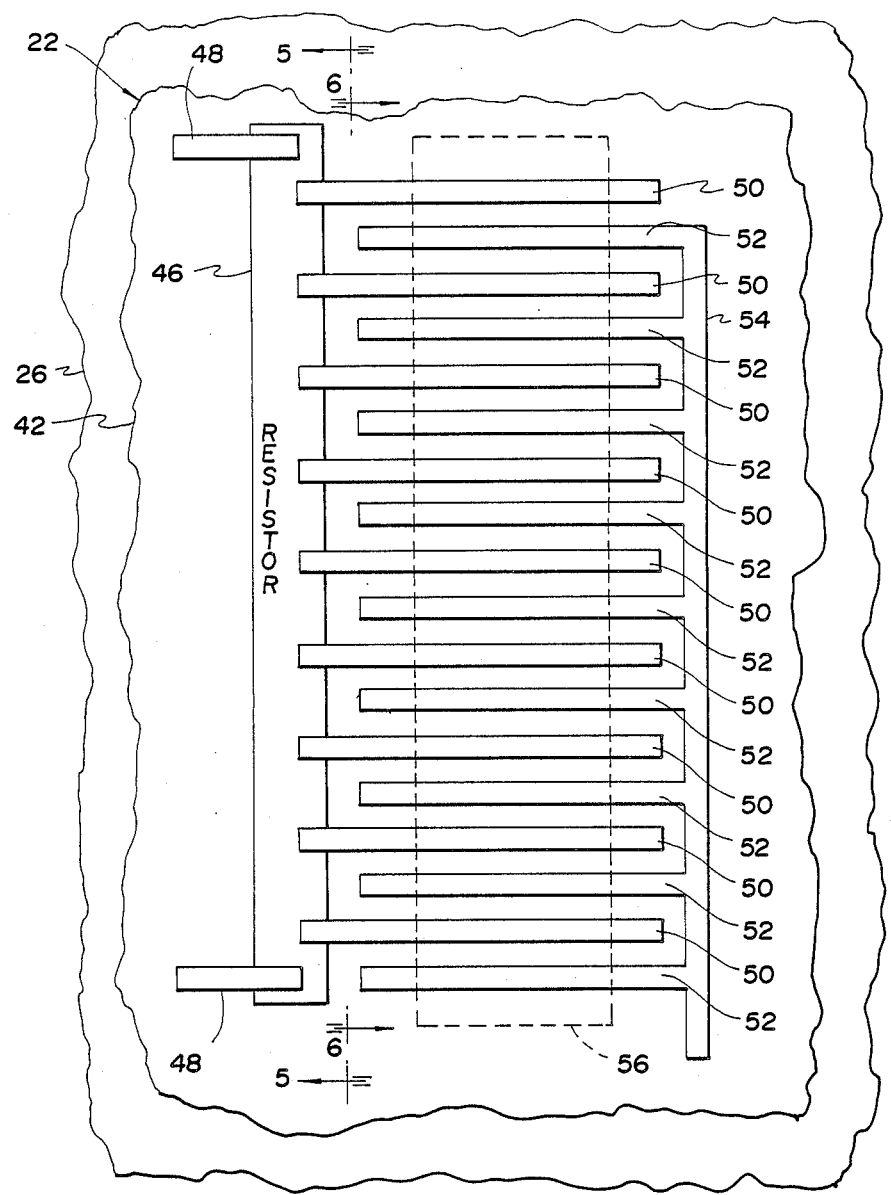
FIG. 3 is a top plan view, partially broken away, of a linear potentiometer including a single resistance circuit element of the sensor.
Figure 5:
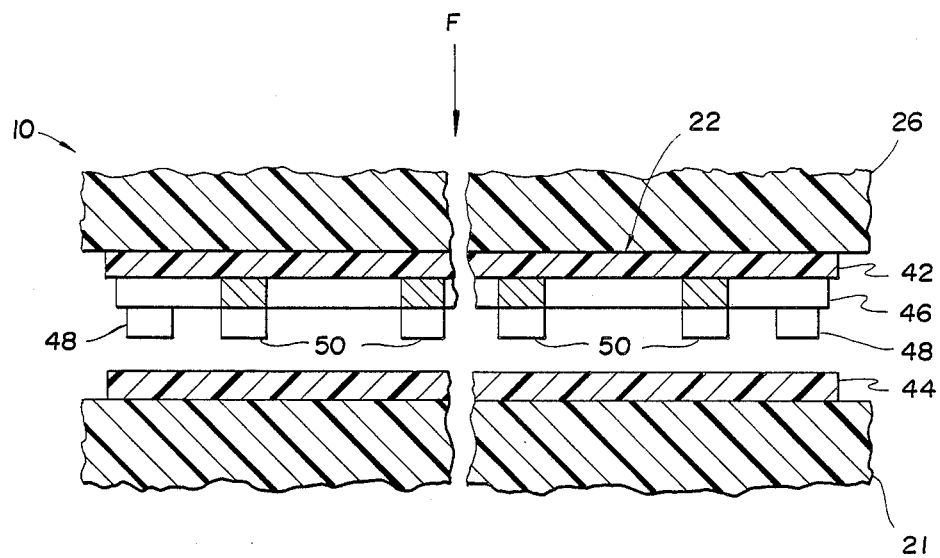
FIG. 5 is a sectional view, partially broken away, taken along lines 5—5 of FIG. 3.

Referring now to FIG. 3 there is illustrated a typical layout or top plan view of the linear potentiometer device 22. Taking FIG. 3 with FIGS. 5 and 6, the potentiometer device 22 preferably includes top and bottom pieces of Mylar brand plastic strips 42 and 44, respectively. On the top strip 42 a conductive ink is preferably silk-screened to form a fixed resistor 46. At opposite ends of the fixed resistor 46 a pair of silver ink electrode pads 48 are formed. Also, on the resistor 46 there are formed parallel, spaced contact members in the form of interdigiting fingers 50. The interdigiting fingers 50 are formed on the resistor 46 and the strip 42 by a silver ink pattern which provides electrical connections to the fixed resistor 46.

A second set of contact members in the form of interdigiting fingers 52 are also silk-screened via silver ink on the top strip 42. The second set of interdigiting fingers 52 are connected in parallel by a common bus bar 54.

The fingers 50 can be termed voltage-gradient fingers and the fingers 52 can be termed voltage pick-up fingers.

Figure 6:
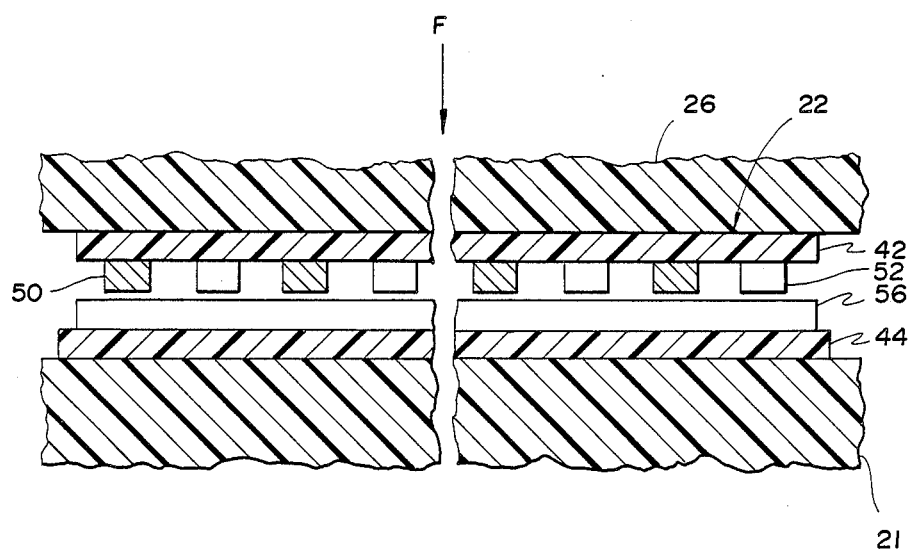
FIG. 6 is a sectional view, partially broken away taken along lines 6—6 of FIG. 3.

A force sensing resistor 56 is silk-screened on the bottom strip 44, as indicated in FIG. 6. The top and bottom strips 42 and 44 are then sandwiched together to form the linear potentiometer device 22 which provides an electrical signal, the strength of which varies linearly depending on the location of the force applied thereto.

The force sensing resistor 56 preferably comprises an ink whose electrical resistance decreases with minimum applied force. Such an ink is produced by Interlink Electronics of Santa Barbara, Calif. This ink is also described in U.S. Pat. Nos. 4,451,714, 4,276,538, 4,314,228 and 4,301,337.

As pressure or force is applied to the outer surfaces of the strips 42 and 44 and, consequently, to the force sensing resistor 56, its resistance locally decreases from infinity to near zero. This causes current to flow from the voltage gradient fingers 50 to the pickup fingers 52 at the point where pressure is applied. This, in turn, produces a voltage on the output bus 54 which is proportional to the position of the applied pressure along the length of the resistor 56 and, consequently, the resistor 46.

Figure 4:
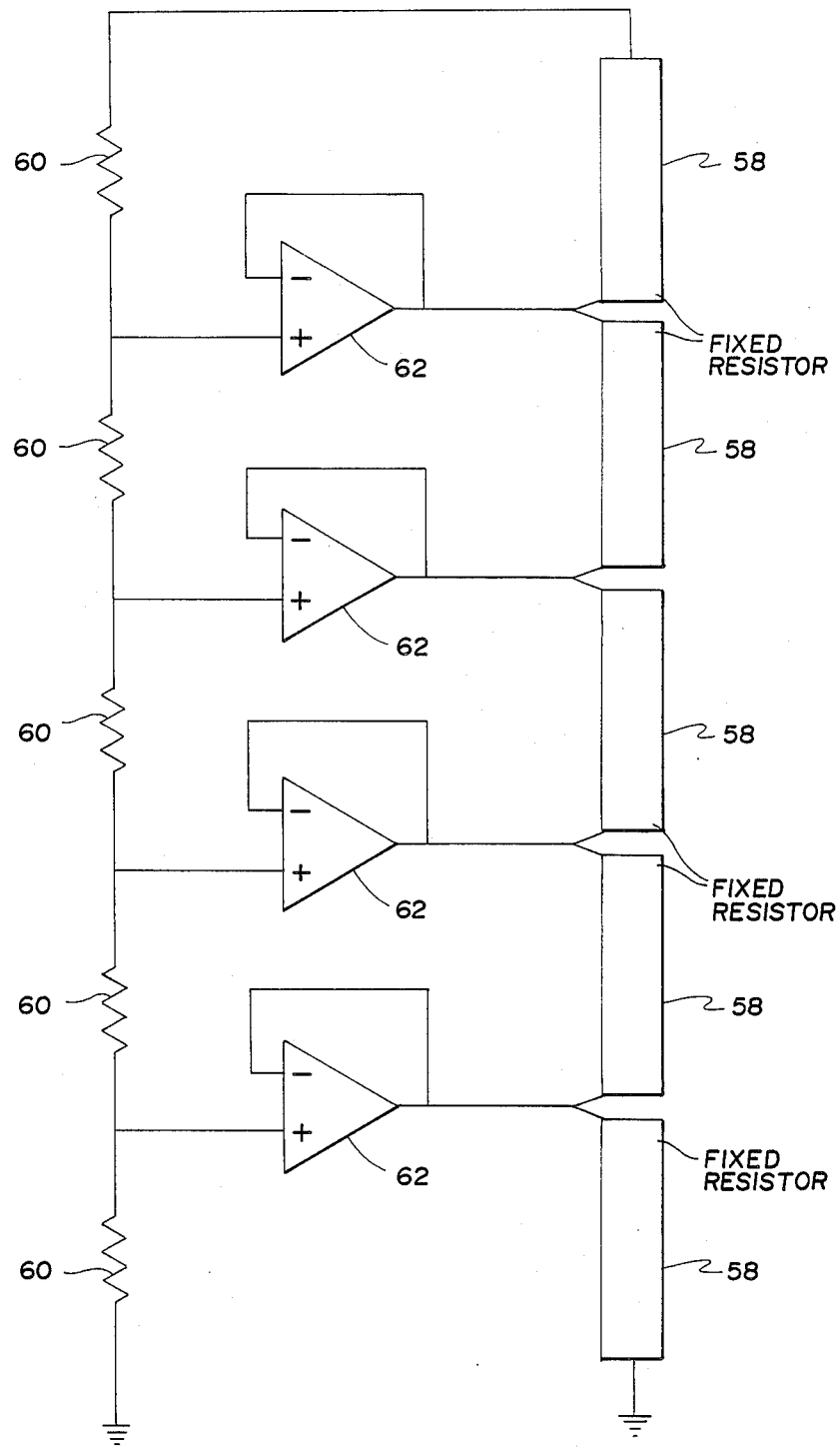
FIG. 4 is a schematic view of an alternative circuit for the resistive layer of FIG. 3.

Referring now to FIG. 4, there is illustrated an electric circuit which may be utilized in the situation where the fixed resistor 46 is not capable of being produced in a continuous fashion for the required length of four to 12 feet. Present manufacturing problems presently interfere with manufacturing the resistor 46 to a length longer than two feet. Consequently, as illustrated in FIG. 4, two foot segments of fixed resistors 58, which take the place of resistor 46 in FIG. 3, are serially connected to obtain the desired length, for example, 10 feet.

However, simply serially connecting the resistors 58 causes a problem because each two foot length must have precisely the same voltage gradient across its length to ensure proper sensor operation. Present manufacturing methods have failed at the present time to produce such a product with less than a 25% tolerance. Consequently, the electronic circuitry of FIG. 4 is required. The electronic circuit includes five serially connected precision wound resistors 60 which are connected in parallel with the fixed resistors 58. Between each pair of interconnecting nodes, an operational amplifier 62 is coupled as a voltage follower to tap off the voltage divider formed by the resistors 60. In this way, the voltages at the nodes of the resistors 60 are forced to appear at the corresponding nodes between the resistors 58.

Figure 7:
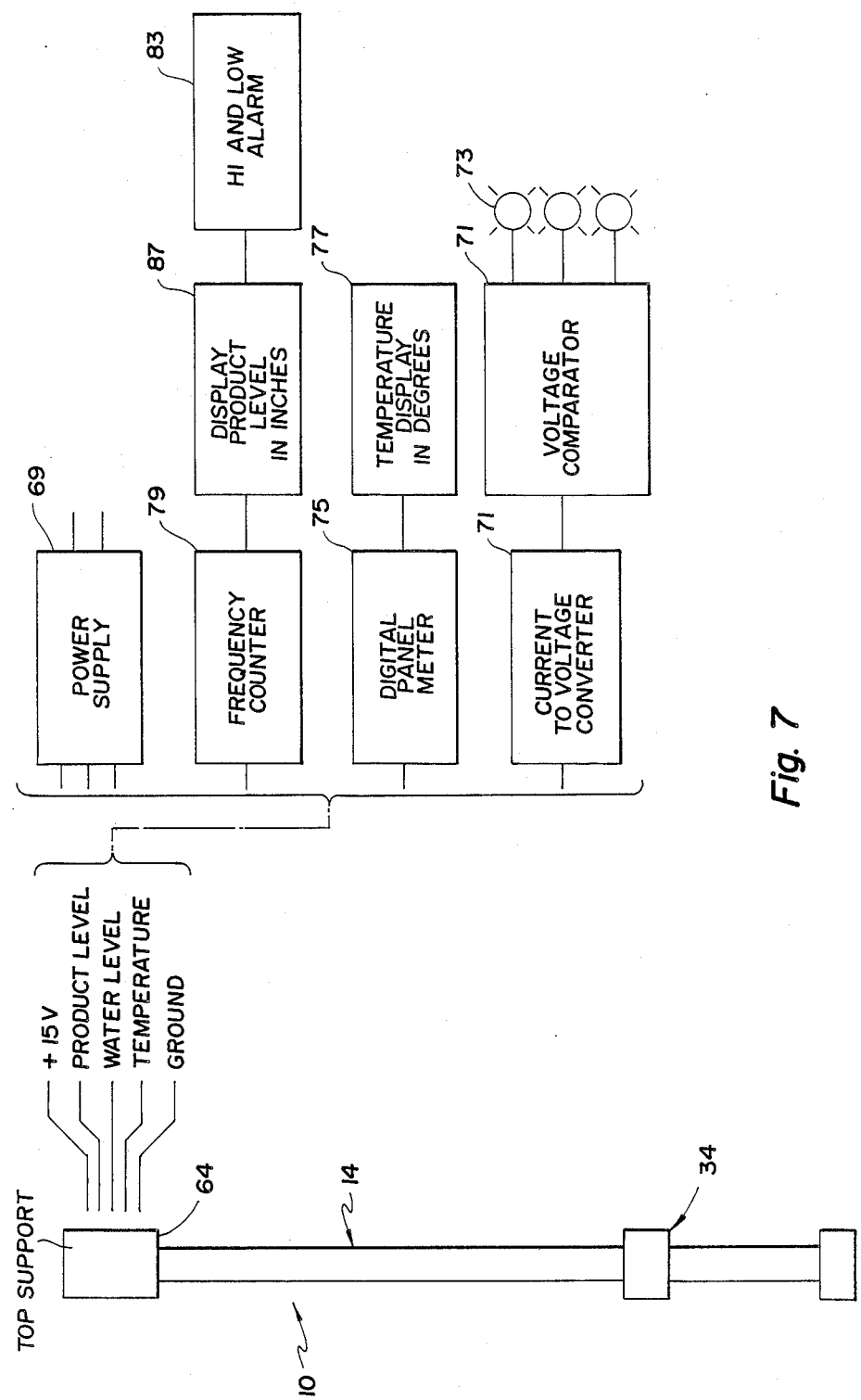
FIG. 7 is schematic view of the sensor and system of the invention with appropriate displays.

Referring again to FIG. 1 and to FIG. 7, a frequency converter circuit is coupled to the bus 54 and is potted in the top portion 64 of the support structure 14 to convert the voltage reading appearing along the bus 54 to a frequency. Preferably, a five wire cable 66 is also in the top portion 64. Two wires are provided from a power supply 69 to the electrodes 48. One wire is provided to coupled the bus 54 to the converter circuit. One wire is provided to couple the detector 20 to a circuit 71 which provides an indication of the amount of water in the tank 12 via an interconnected display 73. The fifth wire is provided to couple a temperature transducer (not shown) to a circuit 75 which provides an indication of the temperature of the fuel via a display 77.

These five electrical wires form the cable 66 which extends into a junction box 68 which, in turn, is electrically connected via a cable 70 to a circuit, generally indicated at 72. The circuit 72 includes a frequency counter 79 which is coupled to the converter circuit. The circuit 72 also includes a continuous display device 81 coupled to the counter 79 which provides a visual display of the liquid level. The circuit 72 also includes an alarm circuit 83 to sound an alarm when the fluid level is either too low or too high.

The above-noted circuits coupled to the sensor 10 may be replaced by a computer including a monitor to provide additional functions. The computer may be programmed with software to: (1) convert level readings from inches to gallons; (2) compensate for variation in volume due to temperature changes; (3) monitor for unexpected volume change or leaks; (4) sound alarms; and (5) have information dumped to a printer or sent over telephone lines to remote locations.

While the best mode for carrying out the invention has herein been described in detail, those skilled in the art to which this invention relates will recognize various alternative designs and embodiments for practicing the present invention as defined by the following claims.

What is claimed is:

1. In a system for measuring the level of a liquid in a container (12), a sensor (10) comprising:
   a vertically extending support structure (14) adapted to be received and retained within the container;
   a pair of electrically spaced terminals (48);
   at least one circuit element (46) electrically coupled between the terminals and having an electrical property which varies at different portions of the circuit element between the terminals, the circuit element being supported on the support structure;
   means for changing the effective electrical property of the circuit element between the terminals, said means for changing being electrically coupled to the different portions of the circuit element and being supported on the support structure to extend vertically therealong, said means for changing including first and second support members (42, 44) having inner and outer surfaces and first and second conductors (50, 52, 56), the first and second support members being juxtaposed so that the inner surfaces face one another in normally spaced apart relationship with the first and second conductors being laterally spaced in actuating proximity between the inner surfaces, the first and second conductors being horizontally movable into electrical conducting relationship at various vertical positions therealong corresponding to different values of the electrical property in response to application of a horizontal force at one of the outer surfaces; and
   a float mechanism (34) connected to said support structure to reciprocate vertically in response to the level of the liquid in the container, said float mechanism including a buoyant part (36) and actuator means (38) connected to the buoyant part in fixed vertical relationship thereto for exerting the horizontal force, the electrical conducting first and second conductors providing an electrical signal which is a function of the vertical position of said actuator means along the support structure.

2. A system for measuring the level of a liquid in container, the system comprising:
   a vertically extending support structure adapted to be received and retained within the container;
   a pair of electrically spaced terminals;
   at least one circuit element electrically coupled between the terminals and having an electrical property which varies at different portions of the circuit element between the terminals, the circuit element being supported on the support structure;
   means for changing the effective electrical property of the circuit element between the terminals, said means for changing being electrically coupled to the different portions of the circuit element and being supported on the support structure to extend vertically therealong, said means for changing including first and second support members having inner and outer surfaces and first and second conductors; the first and second support members being juxtaposed so that the inner surfaces face one another in normally spaced apart relationship with the first and second conductors being laterally spaced in actuating proximity between the inner surfaces, the first and second conductors being horizontally movable into electrical conducting relationship at various vertical positions therealong corresponding to different values of the electrical property in response to application of a horizontal force at one of the outer surfaces;

a float mechanism connected to said support structure to reciprocate vertically in response to the level of the liquid in the container, said float mechanism including a buoyant part and actuator means connected to the buoyant part in fixed vertical relationship thereto for exerting the horizontal force; said so conducting conductors providing an electrical signal which is a function of the vertical position of the actuator means along the support structure; and a circuit coupled to said conductors for processing said electrical signal to provide a corresponding liquid fuel signal indicating the level of the liquid in the container.

3. The invention as claimed in claim 1 or claim 2 wherein one of said first and second conductors is formed from a semiconducting composition having a resistance inversely proportional to the horizontal force.

4. The invention as claimed in claim 3 wherein the at least one circuit element is a resistance element disposed between the first and second support members.

5. The invention as claimed in claim 4 wherein the resistance element is disposed on the first support member in electric conducting relationship with the first conductor.

6. The invention as claimed in claim 3 wherein a plurality of serially connected resistance elements are coupled between the terminals.

7. The invention as claimed in claim 6 further comprising circuit means for providing a predetermined voltage at each of the nodes of serial connection.

8. The invention as claimed in claim 3 wherein the second conductor is the pressure responsive semiconductor composition and wherein the first conductor includes first and second contact members, the first and second contact members being electrically isolated and wherein the second conductor electrically couples the first and second contact members in response to the application of the horizontal force.

9. The invention as claimed in claim 8 wherein each of the first and second contact members has a plurality of interdigiting fingers, the fingers of one of said contact members being in electrical conducting relationship with different respective portions of the circuit element.

10. The invention as claimed in claim 3 wherein the second conductor is disposed in overlying relationship with the first conductor.

11. The invention as claimed in claim 3 wherein said actuating means applies a continuous horizontal force to said means for changing.

12. The invention as claimed in claim 11 wherein said actuating means includes a cylindrical member mounted on said buoyant part for rotation about a horizontal rotary axis.

13. The invention as claimed in claim 3 wherein the container is a vehicle fuel tank.

14. The invention as claimed in claim 3 wherein the container is a fuel storage tank.

15. The invention as claimed in claim 14 wherein the support structure has a length sufficient to allow a bottom portion of the support structure to rest on a bottom portion of the fuel storage tank.

16. The invention as claimed in claim 1 or claim 2 further comprising sealing means for sealing the circuit element and the means for changing in the container.

17. The invention as claimed in claim 16 wherein said sealing means includes a continuous sheet of sealing material for mounting the circuit element and the means for changing on the support structure.

18. The invention as claimed in claim 2 further comprising a detector supported on said support structure at a bottom portion thereof for detecting the level of a second liquid having a density higher than the first liquid and providing a second electrical signal related to the level of the second liquid in the container.

19. The invention as claimed in claim 2 further comprising continuous display means coupled to said circuit for providing a visual display of said liquid level.

* * * * *